No. 657,937. Patented Sept. 18, 1900.
C. B. JACOBS.
PROCESS OF MANUFACTURING NITROGEN COMPOUNDS.
(Application filed Apr. 7, 1899.)
(No Model.)
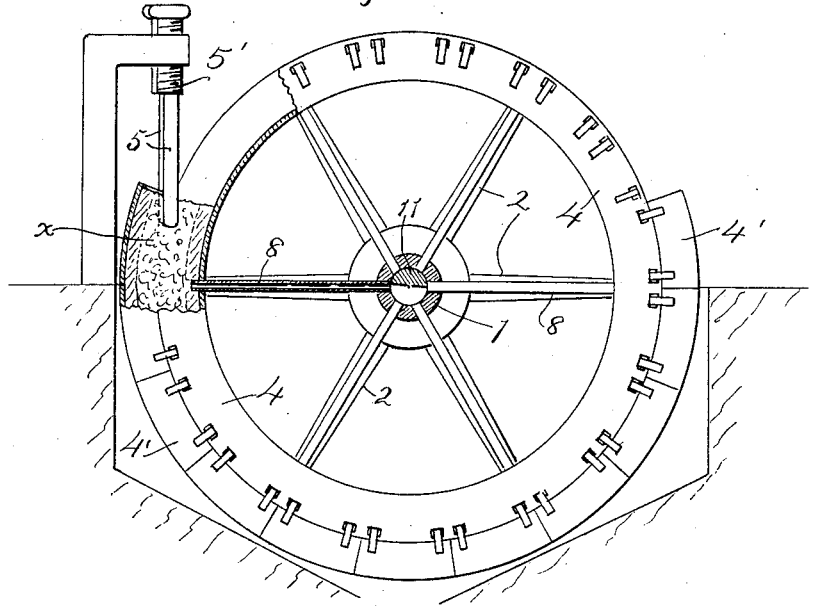
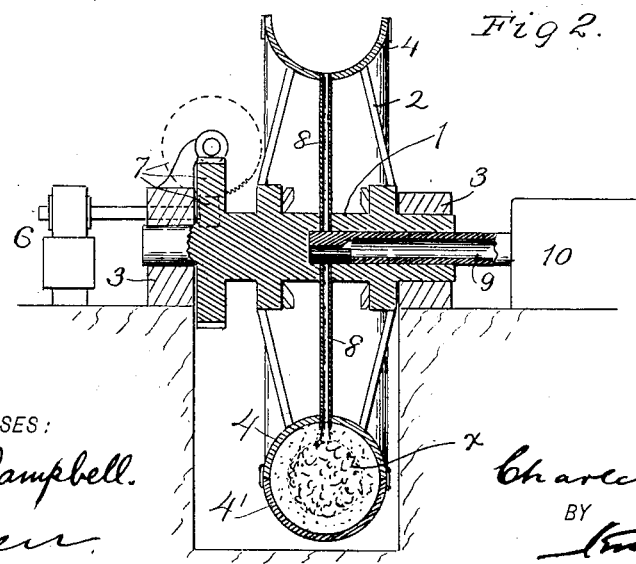
WITNESSES:
Colin C. Campbell.
J. Green.
INVENTOR
Charles B. Jacobs
BY
ATTORNEYS
THE NORRIS PETERS CO., PHOTO-LITHO., WASHINGTON, D. C.

UNITED STATES PATENT OFFICE.

CHARLES B. JACOBS, OF EAST ORANGE, NEW JERSEY, ASSIGNOR, BY MESNE ASSIGNMENTS, TO THE CYANIDE COMPANY, OF NEW JERSEY.

PROCESS OF MANUFACTURING NITROGEN COMPOUNDS.

SPECIFICATION forming part of Letters Patent No. 657,937, dated September 18, 1900.

Application filed April 7, 1899. Serial No. 712,054. (No specimens.)

*To all whom it may concern:*

Be it known that I, CHARLES B. JACOBS, a citizen of the United States, residing at East Orange, in the county of Essex and State of New Jersey, have invented certain new and useful Improvements in Processes of Manufacturing Nitrogen Compounds, of which the following is a specification.

The invention relates to the synthetic production of nitrogen compounds by the treatment of carbids and to the production of carbid in a form suitable for such treatment.

The immediate object of the invention is the production of alkaline-earth metal cyanids, more especially the cyanid of barium for use as such or for conversion into the more commonly used cyanids of sodium or potassium.

I have discovered that when a carbid of an alkaline-earth metal is mixed with coarsely-ground porous carbon or coke and heated to fusion in an electric furnace the resulting product is an extremely-porous fritted mass of carbid and free carbon, and that if this porous material be subjected to the action of nitrogen or a nitrogen-bearing gas—such, for instance, as producer-gas or atmospheric air while still hot, but after it has cooled below the temperature of formation and of fusion of the carbid—a combination of the nitrogen and the carbon of the carbid is effected, forming a cyanid of the base metal of the carbid. The reaction takes place with especial facility and completeness with barium carbid. When in the above-described porous condition, barium carbid is an unsaturated compound and well adapted therefore to take up nitrogen, two atoms of which are absorbed by each molecule of the carbid. The reaction does not take place at the temperature at which the carbid is formed in the electric furnace or, indeed, at any temperature above the fusing-point of the carbid. In fact, at such high temperature the effect would be to at once decompose any nitrogen compound that might be already present. It is therefore necessary to first produce the carbid at a high temperature and then to subject the carbid at a lower temperature to the action of nitrogen. This lower temperature being below the fusing-point of the carbid, it is also necessary to provide means for bringing the nitrogen effectively into contact with same at such lower temperature by maintaining the whole mass in a porous condition.

My invention therefore consists generally in the production of a porous carbid by providing in the mass of carbid cores, bases, or lumps of comparatively-infusible material on which the carbid is distributed with intervening interstices and in the treatment of such porous mass with nitrogen at a suitable temperature to induce chemical action and more particularly in the treatment of barium carbid by such a process.

The accompanying drawings represent an electric furnace suitable for carrying out my invention.

Figure 1 is a partly-sectional elevation of the invention, and Fig. 2 a vertical section at right angles to Fig. 1.

In carrying out the invention I introduce the carbid in a granulated form mixed with coke coarsely ground into the circuit of an incandescent electric furnace, thereby obtaining the necessary heat from the resistance offered by the charge to the passage of the current to cause the carbid to assume a condition of pasty fusion, which, owing to the coarse coke present, brings the charge into a condition of extreme porosity, in which state barium carbid under the influence of heat combines with nitrogen, rapidly forming barium cyanid by a reaction which will be understood from the following structural equation:

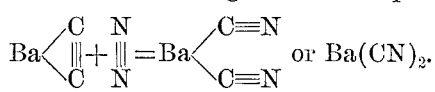

The carbids of the bivalent elements, such as the alkaline-earth metals, are particularly well adapted for this reaction, as they are unsaturated compounds, each carbon atom present having four chemical bonds or affinities, only two of which can be satisfied by the bivalent earth metal leaving the three remaining bonds of each carbon atom to be satisfied by the affinity of the carbon atoms for each other. With such compounds it is comparatively easy to pass from the unsaturated to the saturated state by the addition of new elements carrying the lowest number of satisfying bonds or affinities. When nitrogen is passed through the heated mass of porous carbid, each molecule of carbid takes on two atoms of nitrogen, becoming a saturated compound, the three bonds of each carbon atom being replaced by the three bonds of each of the two nitrogen atoms, since the carbon has a stronger affinity for the nitrogen than for itself. The barium cyanid thus produced may be separated from the excess of coke or carbon in the mass by solution and recrystallization and used directly for the ordinary purposes to which soluble cyanids are applied; or it may be converted into the more commonly used sodium or potassium cyanid by mixing a solution of the barium cyanid with a carbonate of the alkaline metal and filtering off the precipitated barium carbonate for further use in the production of barium cyanid and evaporating the solutions of potassium or sodium cyanid thus obtained to a point at which crystallization takes place on cooling.

The process is most effectively carried out in the rotary carbid furnace described in United States Patent No. 597,945, granted to Charles S. Bradley, January 25, 1898, so modified that nitrogen may be introduced by means of twyers under sufficient pressure to cause it to pass through the cooling mass of porous carbid from the point at which the product is discharged from the furnace to the electrodes between which the carbid is first heated, thus insuring a nitrification period of the longest possible duration without interfering in any way with the continuous operation of the process. Such a furnace is shown in the accompanying drawings, wherein 1 represents a main shaft supported on bearings 3 and carrying by spokes 2 a rim 4, formed as the inner half of an annular drum, removable shells or covers 4' being attached to the rim to complete such annular drum, which serves as the receptacle for the materials operated upon during the process. In practice these shells are attached to the lower half of the rim, being added to one side and removed from the other as the wheel-frame 2 3 rotates. Two carbon terminals 5, with suitable feeding devices 5', are located so that the carbons may project into the annular receptacle, as indicated in Fig. 1. Means, such as a motor 6 and gearing 7, are provided for slowly rotating the annular receptacle, the mechanism, as so far described, being similar to that shown in the patent above referred to. To adapt this apparatus for carrying out my process, pipes or tubular connections 8 may be provided at a plurality of points in the annular rim and communicating with a hollow bore in the shaft 1, said bore being connected by a pipe 9 with a suitable source of nitrogen under pressure, here indicated as a tank 10.

Valve devices are provided for cutting off the supply of nitrogen from those parts of the annular rim which are unoccupied by carbid material, and for this purpose I have shown a valve formed by an extension 11 of pipe 9, which, being stationary, acts as a valve-stem in coöperation with the openings of pipes 8, so that the nitrogen is admitted to the carbid material (indicated at $x$) shortly after the production of the carbid between the electrode-terminals and after the material has begun to cool, and the supply of nitrogen is maintained in contact with the carbid after the latter has cooled below its melting-point, being only cut off when the carbid finally cools to ordinary temperatures. Inasmuch as the reaction with nitrogen only takes place at temperatures below the melting-point of the carbid, it is essential to the process that the carbid material should be maintained in a more or less porous condition, since if it were allowed to melt into a compact mass it would be impenetrable to the nitrogen.

To avoid the expense of manufacturing barium carbid in a separate operation for use in the process, I prefer to use as my raw material for introduction into the rotary furnace a mixture of barium carbonate or barium hydrate with sufficient carbon to produce a carbid and also an excess of coarsely-ground coke to give the product the necessary degree of porosity. The process then takes place in two steps. In the first step porous barium carbid is transitorily formed between the electrodes and passes over to the cyanid by absorption and conversion during the cooling or nitrification period, as the nitrogen ascends through the mass of porous carbid during the rotation of the furnace. By this means the operation in the rotary furnace renders the formation of carbid and its conversion into cyanid simultaneously continuous. By either method of operation the resulting product is a fritted porous mass of crude barium cyanid.

While I prefer to use carbon as the material for the refractory cores or bases on which the carbid is distributed by fusion, I may use any material which is sufficiently refractory under the conditions of the process.

Having thus described my invention, what I claim as new therein, and desire to secure by Letters Patent, is—

1. The process of making a nitrogen compound consisting in subjecting a mixture of carbid and coarsely-ground coke to the action of heat in an electric furnace, whereby the carbid is caused to fuse and coat the particles of coke, allowing the mass to cool below the temperature of fusion of the carbid, and subjecting the porous mass at such lower temperature to the action of nitrogen.

2. The process of forming the cyanid of an alkaline-earth metal consisting in subjecting an alkaline-earth compound mixed with carbon in excess of the amount required for the formation of carbid to the heat of an electric furnace, whereby a porous carbid composition, consisting of particles of carbon coated with carbid, is formed, allowing the said porous composition to cool below the temperature of fusion of the carbid and subjecting the porous mass at such lower temperature to the action of nitrogen.

CHARLES B. JACOBS.

Witnesses:
A. P. KNIGHT,
M. V. BIDGOOD.